(12) United States Patent
Perin et al.

(10) Patent No.: US 6,568,023 B2
(45) Date of Patent: May 27, 2003

(54) WIPER PIVOT

(75) Inventors: Giovanni Perin, Rochester Hills, MI (US); Peter John Schuster, Dearborn, MI (US)

(73) Assignee: Ford Global Technologies, L.L.C., Dearborn, MI (US)

(*) Notice: Subject to any disclaimer, the term of this patent is extended or adjusted under 35 U.S.C. 154(b) by 317 days.

(21) Appl. No.: 09/736,756

(22) Filed: Dec. 14, 2000

(65) Prior Publication Data

US 2002/0073501 A1 Jun. 20, 2002

(51) Int. Cl.$^7$ ............... A47L 1/00; B60S 1/02
(52) U.S. Cl. ............ 15/250.3; 15/250.31; 15/250.34; 296/96.15; 296/189
(58) Field of Search ............ 15/250.3, 250.31, 15/250.34, 250.351, 350.001; 296/189, 96.15

(56) References Cited

U.S. PATENT DOCUMENTS

| | | |
|---|---|---|
| 3,131,412 A | 5/1964 | McClain et al. |
| 3,344,458 A | 10/1967 | Deibel et al. |
| 3,790,985 A * | 2/1974 | Kessler ............ 15/250.34 |
| 4,069,539 A | 1/1978 | Klingberg et al. |
| 5,337,439 A | 8/1994 | Frey et al. |
| 6,513,186 B1 * | 2/2003 | Zimmer ............ 15/250.31 |

FOREIGN PATENT DOCUMENTS

GB 1027217 * 4/1966
WO WO 9221536 * 12/1992

OTHER PUBLICATIONS

Technically Speaking, Honda Reduces Crash G Forces, European Automotive Design, Mar. 1999.

Suguru Yoshida, et al, SAE Technical Paper Series 1999–01–0075, Development of a Vehicle Structure with Protective Features for Pedestrians, pp. 1–6, (Reprinted from: Vehicle Aggressivity and Compatibility in Automotive Crashes SP–1442) Mar. 1–4, 1999, SAE Publications Group.

* cited by examiner

Primary Examiner—Robert J. Warden, Sr.
Assistant Examiner—Laura C Cole
(74) Attorney, Agent, or Firm—Gigette M. Bejin

(57) ABSTRACT

A crushable windshield wiper pivot is provided. The crushable wiper pivot includes a pivot base, a hollow sleeve, and a cap. The pivot base is driven by a windshield wiper motor and adaptable to reciprocate the windshield wiper arm and its components across the windshield. The pivot base is disposed partially in a vehicle cowl. The hollow sleeve includes a first end mounted on the pivot base, a middle section adaptable to crush outwardly and vertically, and a second end. The cap of the present invention is mounted on the second end of the hollow sleeve. The cap has a surface adaptable to mate with a base of a wiper arm whereby the cap is vertically displaced and the hollow sleeve crushes outwardly and vertically at the middle section when subjected to a pedestrian impact.

9 Claims, 2 Drawing Sheets

WIPER PIVOT

FIELD OF THE INVENTION

The present invention generally relates to the field of windshield wiper systems.

BACKGROUND OF THE INVENTION

Pedestrian safety is a concern of automobile manufacturers. Vehicle manufacturers strive to minimize pedestrian injuries in vehicle collisions by making a variety of modifications to vehicles. Efforts include making vehicles more visible with brighter colors, anti-lock brakes which allow the driver to swerve and avoid contact with a pedestrian, devices such as air bags and spoilers which deploy from the vehicle to prevent pedestrian impact, and softer fronts on vehicles to reduce the level of head and leg injury.

According to statistics, head injuries are the major cause of death in pedestrian-vehicle collisions. In order to alleviate the pedestrian injuries due to impact with a vehicle, softer fronts on vehicles have been implemented from the bumper to the hood and to the wiper pivots. For example, vehicle packaging may be modified to create greater clearance between the hood, engine, and suspension. However, a vehicle generally includes specific hard points such as the hood hinges and the wiper pivots which can cause severe injury to a pedestrian's head upon impact. Generally, the wiper pivots are solid metal appendages below a vehicle windshield which serve as mounting points for wiper arms. The wiper pivots are generally affixed to the cowl of a vehicle. To avoid wiper pivot injuries, a method of reducing pedestrian injury from a wiper pivot is to provide a wiper pivot which slides into the cowl of a vehicle. The wiper pivot of the prior art is mounted on a spring-loaded clip below the cowl of the vehicle. The spring-loaded mounting allows the wiper pivot to slide into the cowl when it is subjected to an impact. The wiper pivot of the prior art slides in the cowl and is susceptible to defects due to debris or corrosion lodged between the pivot and the cowl. Furthermore, the wiper pivot of the prior art creates additional vehicle packaging issues as the device requires ample space below the cowl to allow the pivot to slide.

Consequently, a need has developed for a compact and durable wiper pivot which reduces the chances for injury to a pedestrian by absorbing energy from a pedestrian impact.

SUMMARY OF THE INVENTION

Accordingly, it is a principle object of the present invention to provide a compact and durable wiper pivot which reduces injury to a pedestrian upon impact.

It is yet another object of the present invention to provide a crushable windshield wiper pivot which absorbs energy upon impact with a pedestrian.

In accordance with the above objects and other objects and features of the present invention, a crushable windshield wiper pivot is provided. The crushable wiper pivot includes a pivot base, a sleeve, and a cap. The pivot base is driven by a windshield wiper motor and adaptable to reciprocate the windshield wiper arm and its components across the windshield. The pivot base is partially disposed in a vehicle cowl. The hollow sleeve includes a first end mounted on the pivot base, a middle section adaptable to crush outwardly and vertically, and a second end. The cap of the present invention is mounted on the second end of the hollow sleeve. The cap has a surface adaptable to mate with a base of a wiper arm. The cap may include a threaded shaft for receiving a wiper arm and a nut. Accordingly, when a pedestrian impacts the vehicle at the windshield wiper pivots, the wiper arm, nut and the cap are displaced as the hollow sleeve crushes outwardly and vertically at the middle section thereby absorbing energy from the impact and reducing injury to the pedestrian.

As those skilled in the art will recognize, the embodiments of this invention may vary depending upon the specific requirements of a vehicle. Accordingly, the particular size and shape of the cap, the sleeve, and the pivot base may vary, depending on the particular application.

The above objects and other objects, features, and advantages of the present invention are more readily understood from a review of the attached drawings and accompanying specification and claims.

DETAILED DESCRIPTION OF THE PREFERRED EMBODIMENT

The present invention provides for a crushable windshield wiper pivot that absorbs energy upon impact with a pedestrian. By crushing vertically and outwardly upon impact, this wiper pivot design reduces injury to a pedestrian.

Figure 1A:
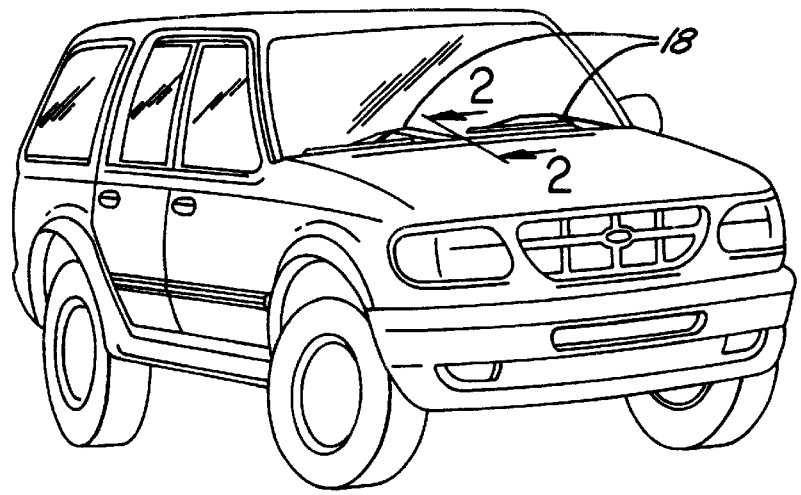
FIG. 1a is a perspective view of the present invention illustrated in operational relationship with a motor vehicle.

With reference to FIG. 1a, the present invention 10 is installed on a motor vehicle with the windshield wiper arms 18 attached. The wiper pivots 10 serve as mounting points for the wiper arms 18 shown in FIG. 1a.

Figure 1B:
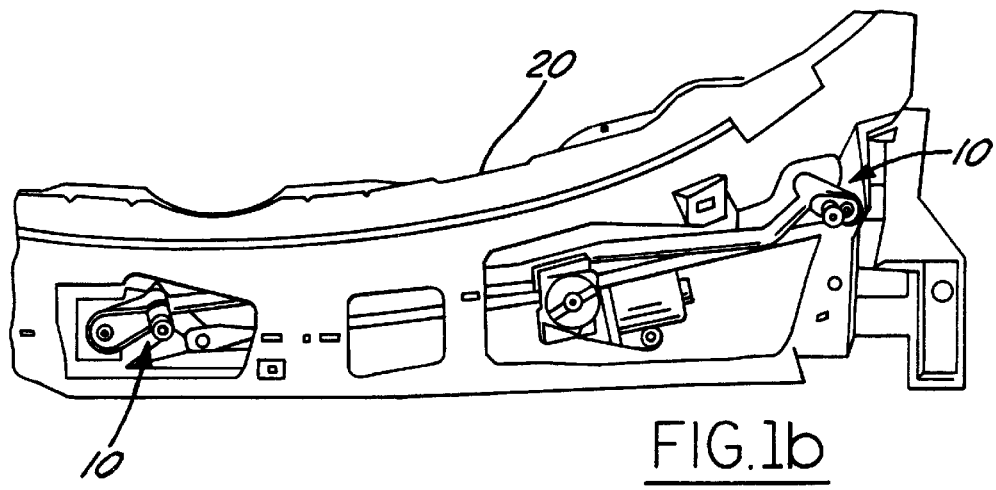
FIG. 1b is an enlarged plan view of the present invention installed on the cowl of a motor vehicle without the windshield wiper arms attached.

Referring now to FIG. 1b, an enlarged plan view of the present invention 10 is shown as installed on the cowl 20 of a motor vehicle without the windshield wiper arms attached. The wiper pivots 10 are affixed to the cowl 20 and protrude from the cowl 20 of the vehicle.

Figure 2:
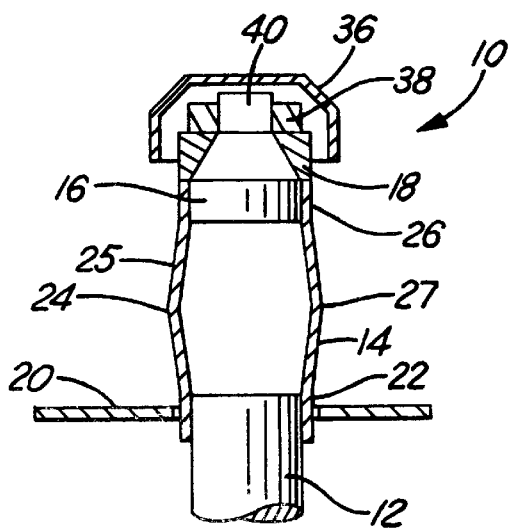
FIG. 2 is an enlarged schematic cross-sectional view of the crushable windshield wiper pivot along lines 2—2 in FIG. 1.

Referring now to FIG. 2, a schematic cross-sectional view of the present invention 10 is shown. The crushable wiper pivot 10 includes a pivot base 12, a sleeve 14, and a cap 16. The pivot base 12 is driven by a windshield wiper motor (not shown) and adaptable to reciprocate the windshield wiper arm 18 and its components across the windshield. The pivot base 12 is disposed partially below the line of the vehicle cowl 20. The hollow sleeve 14 includes a first end 22 mounted on the pivot base 12, a middle section 24 adaptable to crush outwardly and vertically, and a second end 26. The sleeve 14 preferably but not necessarily has a thickness in the approximate range of 0.6 mm to 2.0 mm.

The cap 16 of the present invention 10 is mounted on the second end 26 of the sleeve 14. The cap 16 of the present invention is preferably but not necessarily a solid member which is press-fitted and/or welded into the sleeve 14. The cap 16 may a grooved surface 32 and a threaded shaft 40 adaptable to mate with a base 18 of a wiper arm 18 and the sleeve 14. The cap may further include a smooth surface 30 adaptable to fit along the inner portion of the sleeve 14. A nut 38 is threaded onto the shaft 40 of the cap 16 and further secures the wiper arm 18 onto the cap 16.

Figure 3:
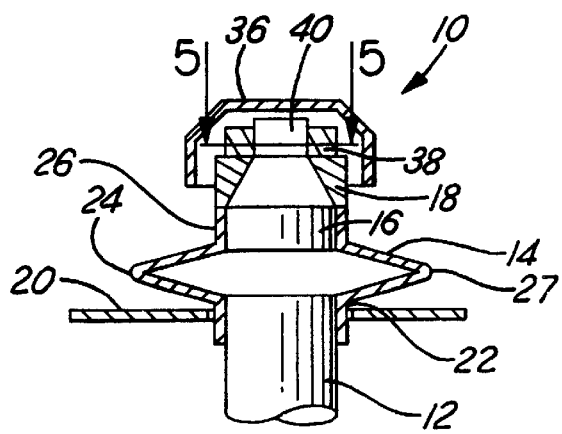
FIG. 3 is a schematic cross-sectional front view of the crushable windshield wiper pivot in a second mode after pedestrian impact.

As shown in FIG. 3, upon impact, the cap 16, wiper arm 18 and nut 38 are vertically displaced and the hollow sleeve 14 crushes outwardly and vertically in the downward direction at the middle section 24 when subjected to a pedestrian impact. By crushing the wiper pivot 10 in a pedestrian impact and absorbing energy, injury to the pedestrian is reduced.

It should also be appreciated that the cap 16, the sleeve 14 and the pivot base 12 may be formed of one component or two components instead of three separate components welded together.

With reference to FIGS. 2 and 3, the middle section 24 of the sleeve 14 may also include a flared section 25 which is predisposed to crush outwardly and vertically when subjected to an impact. The flared section 25 may, but not necessarily, be configured as shown in FIG. 2 where the middle section 24 includes an indentation 27 in an outward direction. This configuration allows the middle section to crush outwardly and vertically as the windshield wiper pivot is subjected to an impact as shown in FIG. 3.

Figure 4:
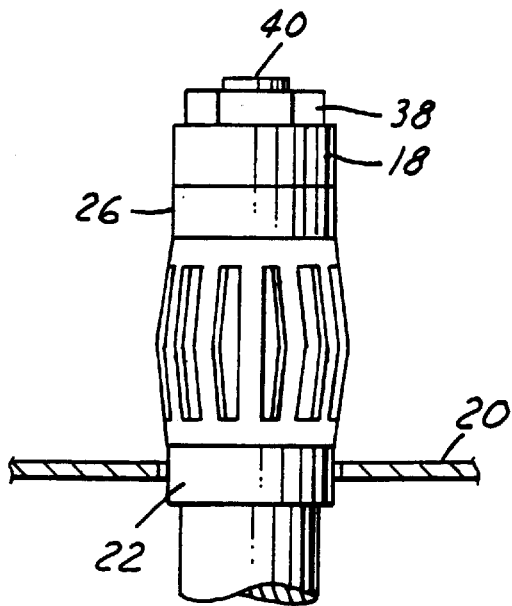
FIG. 4 is a schematic front view of the crushable wiper pivot before a pedestrian impact.
Figure 5:
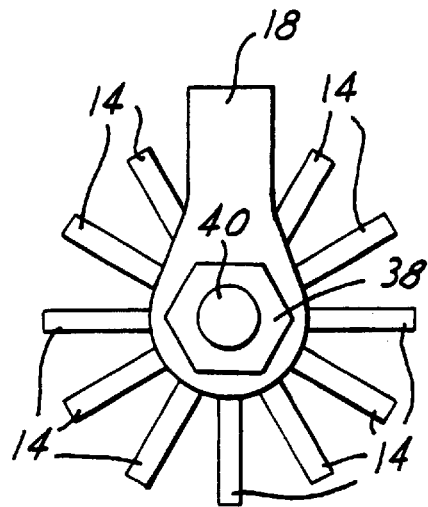
FIG. 5 is a schematic cross-sectional plan view of the base of the wiper arm, cap and the sleeve after a pedestrian impact, taken along lines 5—5 of FIG. 3.
Figure 6:
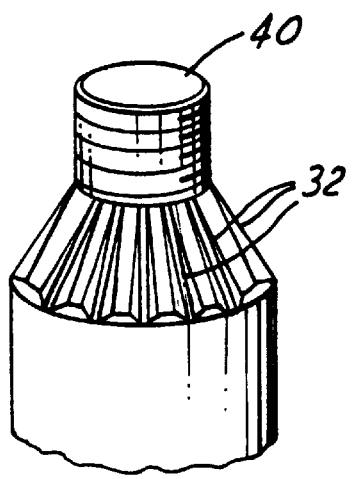
FIG. 6 is an enlarged schematic front view of the cap of the present invention.
Figure 7:
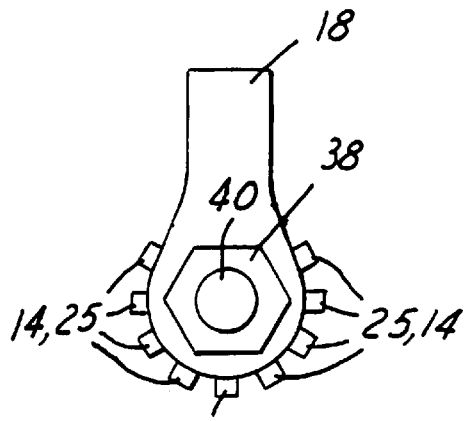
FIG. 7 is a schematic plan view of the base of the wiper arm, cap, and sleeve before a pedestrian impact.

Referring now to FIG. 4, the sleeve 14 of the present invention may also include apertures 40 or slits in the middle section 24. The slits or apertures 40 in conjunction with the flared section 25 of the sleeve 14 further predispose the sleeve 14 to crush outwardly and vertically when subjected to a pedestrian impact as shown in FIG. 5.

With reference to FIGS. 2, 3, 6, and 7, in order to ensure that the windshield wiper arm 18 is securely fixed to the windshield wiper pivot 10, the sleeve 14 is fitted at the second end 26 with a cap 16. The surface 30 of the cap 16 may be formed of a plurality of grooves 32 to affix the base of the wiper arm 18 to the pivot. As indicated above, a nut is further provided on the threaded section 40 of the cap to secure the wiper arm 18 on the pivot 10. The cap 16 may be mounted to the sleeve 14 as a press-fitted component and/or may be welded to the sleeve 14.

Also referring to both FIGS. 2 and 3, the arm head cover 36 of the present invention may be designed so that the wiper pivot 34 only extends into the arm head cover 36 to only enclose the cap 16, wiper arm 18 and nut 38 in arm head cover 36. The arm head cover 36 of the preferred embodiment may be pivotally attached to the wiper arm 18 and may be pivoted upward to reveal the wiper pivot 10. By decreasing the depth to which the wiper pivot 10 sits in the arm head cover 36, the wiper pivot 10 is able to crush outwardly and vertically upon impact without being limited by the arm head cover 36. The windshield wiper pivots 10 or the windshield wiper system as a whole may be formed of material such as steel, Aluminium or Magnesium. However, it is preferable to use one type of material to prevent galvanic corrosion between the wiper components.

While the best mode for carrying out the invention has been described in detail, those familiar with the art to which this invention relates will recognize various alternative designs and embodiments for practicing the invention as defined by the following claims. The words used in the specification are words of description rather than limitation, and it is understood that various changes may be made without departing from the spirit and the scope of the invention.

What is claimed is:

1. A collapsible windshield wiper pivot for preventing pedestrian injury upon impacting a vehicle, the collapsible windshield wiper pivot comprising:

a pivot base disposed in a vehicle cowl, the pivot base being driven by a windshield wiper motor and adaptable to reciprocate a windshield wiper arm;

a hollow sleeve having a first end mounted on the pivot base, a middle section adaptable to crush outwardly and vertically, and a second end; and a cap mounted on the second end of the hollow sleeve, the cap having a surface adaptable to mate with a base of a wiper arm whereby the cap is vertically displaced and the hollow sleeve crushes outwardly and vertically at the middle section when subjected to a pedestrian impact.

2. The collapsible windshield wiper pivot recited in claim 1, wherein the surface of the cap is formed of a plurality of grooves to affix the wiper arm to the windshield wiper pivot.

3. The collapsible windshield wiper pivot recited in claim 1 wherein middle section includes a flared section predisposed to crush outwardly and vertically when subjected to an impact.

4. The collapsible windshield wiper pivot recited in claim 1 wherein the middle section includes at least one indentation enabling the middle section to crush outwardly and vertically when subjected to an impact.

5. The collapsible windshield wiper pivot recited in claim 1 wherein the cap, the sleeve and the pivot base are welded together.

6. The collapsible windshield wiper pivot recited in claim 1, wherein the cap includes a threaded shaft for receiving the wiper arm and a nut.

7. A collapsible windshield wiper pivot for preventing pedestrian injury upon impacting a vehicle, the collapsible windshield wiper pivot comprising:

a pivot base disposed in a vehicle cowl, the pivot base being driven by a windshield wiper motor and adaptable to reciprocate a windshield wiper arm;

a hollow sleeve having a first end mounted on the pivot base, a middle section having at least one indentation, and a second end; and a cap mounted on the second end of the hollow sleeve, the cap having a surface adaptable to mate with a base of a wiper arm whereby the cap is vertically displaced and the hollow sleeve crushes outwardly and vertically via the at least one indentation when subjected to a pedestrian impact.

8. The collapsible windshield wiper pivot recited in claim 7, wherein the surface of the cap is formed of a plurality of grooves to affix the wiper arm to the windshield wiper pivot.

9. The collapsible windshield wiper pivot recited in claim 7, wherein the cap, the sleeve and the pivot base are joined with welds.

* * * * *